United States Patent [19]
Husted et al.

[11] Patent Number: 5,109,963
[45] Date of Patent: May 5, 1992

[54] FOUR WAY MANUAL SEAT ADJUSTER CLUTCH ASSEMBLY

[75] Inventors: David M. Husted, Ann Arbor; William H. Jones, Rochester; William R. Tighe, Dearborn, all of Mich.

[73] Assignee: Hoover Universal, Inc., Plymouth, Mich.

[21] Appl. No.: 672,896

[22] Filed: Mar. 21, 1991

[51] Int. Cl.⁵ .......................... F16D 51/00; B60N 2/00
[52] U.S. Cl. ..................................... 192/8 C; 297/345
[58] Field of Search .................. 192/7,8 C, 26, 43; 188/82.2; 297/338, 345

[56] References Cited

U.S. PATENT DOCUMENTS

| | | | |
|---|---|---|---|
| 3,393,777 | 7/1968 | Sacchini | 192/8 C |
| 3,726,370 | 4/1973 | Hubbard | 192/8 C |
| 4,371,065 | 2/1983 | Engels et al. | 192/8 C |
| 4,767,157 | 8/1988 | Kazaoka et al. | 297/345 X |
| 4,778,138 | 10/1988 | Yamada | 192/8 C X |
| 4,926,987 | 5/1990 | Honma | 192/8 C |

FOREIGN PATENT DOCUMENTS 0089236 5/1984 Japan ........................... 297/345

Primary Examiner—Rodney H. Bonck
Attorney, Agent, or Firm—Harness, Dickey & Pierce

[57] ABSTRACT

A clutch assembly for a four way manual seat adjuster is provided which includes a stationary cylindrical housing in which is disposed a pair of coil clutch springs. The springs are biased to expand radially outwardly into frictional engagement with the housing whereby rotation of the springs is prevented. A torsion tube extending concentrically through said housing is coupled to the springs so that rotation of the torsion tube is prevented when the springs are frictionally engaging the housing. A release handle is provided to selectively release one spring or the other enabling rotation of the torsion tube in one direction. The four way manual seat adjuster linkage is coupled to the torsion tube to raise and lower the seat upon rotation of the torsion tube.

21 Claims, 6 Drawing Sheets

FOUR WAY MANUAL SEAT ADJUSTER CLUTCH ASSEMBLY

BACKGROUND AND SUMMARY OF THE INVENTION

The present invention pertains to a four-way manual seat adjuster and in particular to a clutch assembly for holding a seat in position after it has been adjusted in the vertical direction.

Conventional vehicle seat assemblies are manually adjustable in the fore and aft direction to accommodate occupants of various sizes. A six way power adjustable seat is also available in which the seat can be raised and lowered and pivoted forward and rearward about a lower rear axis in addition to being adjustable fore and aft. A power adjustable seat however, requires a relatively complex adjustment mechanism and one or more electric motors.

Four way adjustable seats have recently been developed that provide for a manual adjustment to raise and lower the seat in addition to the typical fore and aft adjustment. However, the operating controls for many four way manually adjustable seats have an relatively cumbersome to use. For example, one mechanism includes an operating lever that is raised and lowered to move the seat and is laterally deflected to engage a pin extending from the operating lever in and out of selected openings in an adjacent frame to hold the seat in place. It may be difficult, when the seat is loaded, to disengage the pin from the frame to make an adjustment and furthermore, the mechanism only provides fixed adjustment positions rather than infinite adjustment.

It is an object of the present invention to provide a clutch assembly for use in a four way manual seat adjuster to hold the seat in position and which is simple in operation and provides infinite seat adjustment.

The seat adjuster includes two torque tubes extending laterally between opposite sides of the seat assembly. The torque tubes are pivotally connected to the upper sliding rails of the seat assembly for fore and aft movement. A bell crank is coupled to the forward torsion tube and a link is pivotally coupled at one end to the bell crank and to the rear torsion tube through a crank arm enabling both torsion tubes to rotate in unison. A riser plate is also pivotally connected to the bell crank at its forward end and connected to the rear torsion tube through a second crank arm at its rear end. Rotation of the torsion tubes will raise or lower the riser plate. The seat cushion and seat back are carried by the riser plate for vertical motion.

The clutch assembly of this invention is used to hold the front torsion tube stationary and prevent its rotation. The clutch assembly includes a cylindrical housing which is concentric about the forward torsion tube and fixed to the sliding rail to hold it stationary. The clutch assembly includes two coil clutch springs having a relaxed diameter slightly less than the inside diameter of the housing. A biasing means engages the ends of the springs, forcing the springs to expand radially outward to frictionally engage the clutch housing to prevent rotation of the clutch springs. The forward torsion tube is also coupled to the springs to prevent rotation of the torsion tube when the clutch springs are frictionally engaging the housing.

An operating handle for the clutch assembly includes a shaft portion parallel to the forward torsion tube and a handle portion extending generally radially from the shaft portion. The shaft portion rotates about the longitudinal axis of the torsion tube and releases the clutch spring biasing means to enable the torsion tube to rotate in the direction of rotation of the handle thus raising or lowering the seat assembly.

Further objects, features and advantages of the invention will become apparent from a consideration of the following description and the appended claims when taken in connection with the accompanying drawings.

DETAILED DESCRIPTION OF THE INVENTION

Figure 1:
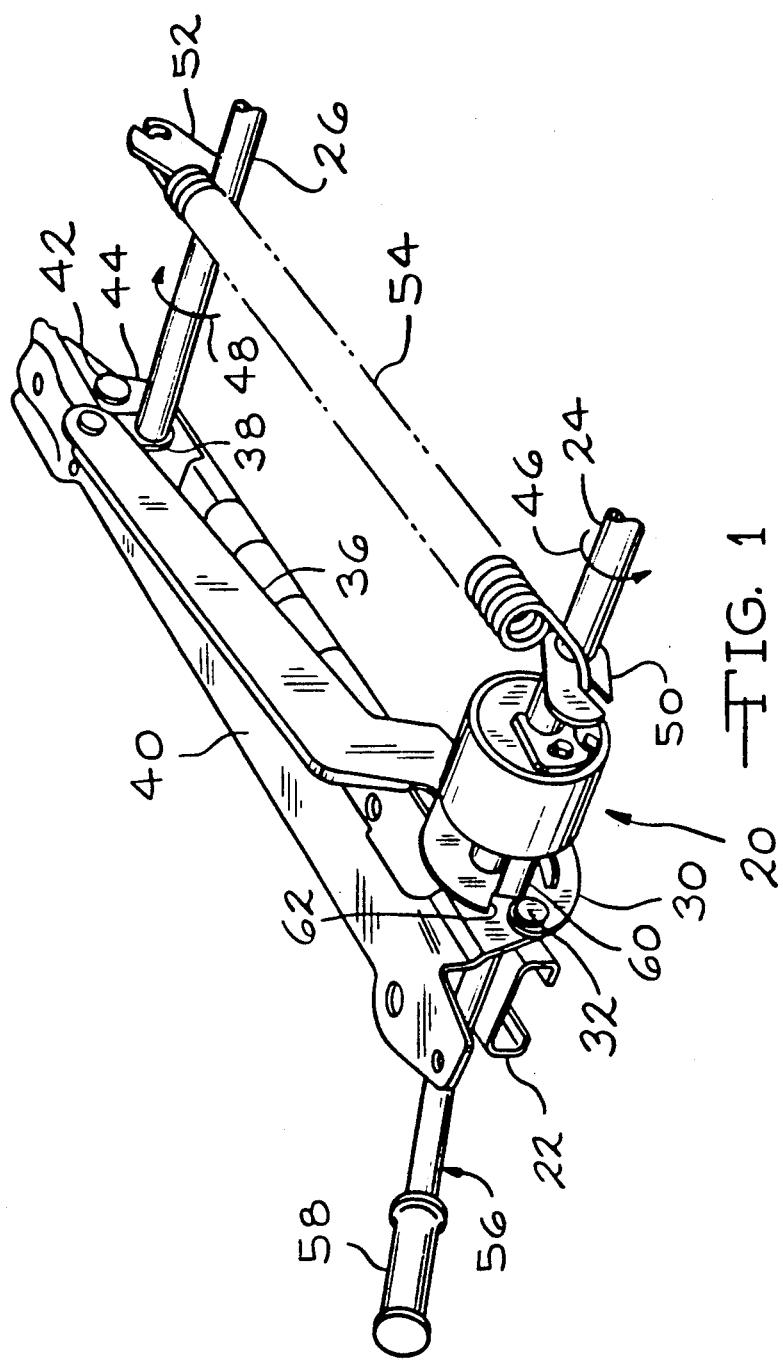
FIG. 1 is a fragmentary perspective view of the vertical adjustment portion of a four way manual seat adjuster with the clutch assembly of the present invention.

The four-way manual seat adjuster clutch assembly of the present invention is shown in FIG. 1 and designated generally at 20. Only the right hand portion of the seat adjuster is shown in FIG. 1. The seat adjuster includes a sliding rail 22 which is movable fore and aft upon a stationary rail (not shown) fixed to the vehicle floor pan in a conventional manner. A similar sliding rail is positioned along the opposite side of the seat assembly.

A front torsion tube 24 extends laterally across the seat between the sliding rails adjacent the forward edge of the seat assembly. Likewise, a rear torsion tube 26 extends laterally between the two sliding rails near the rear of the seat assembly. A solid rod 28, shown in FIG. 4, extends through the front torsion tube 24 and is affixed to the sliding rails at its ends. Rod 28 provides support for the torsion tube 24. Torsion tube 24 is freely rotatable with respect to the rod 28.

Figure 4:
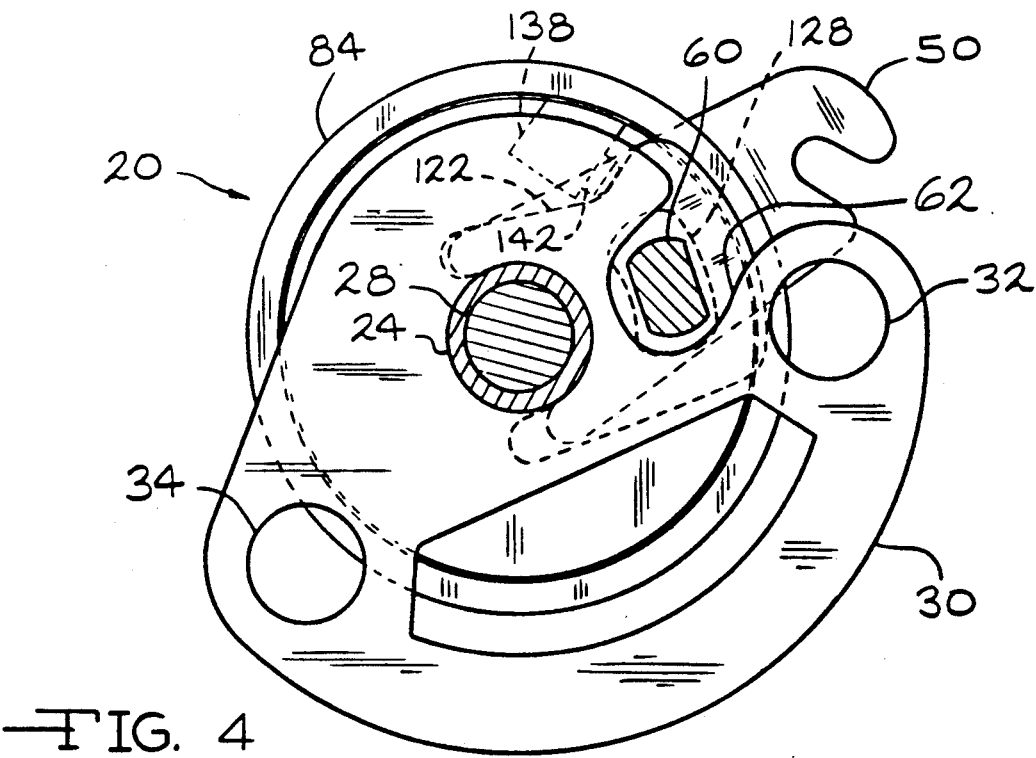
FIG. 4 is a sectional view of the clutch assembly as seen from substantially the line 4—4 of FIG. 3.
Figure 5:
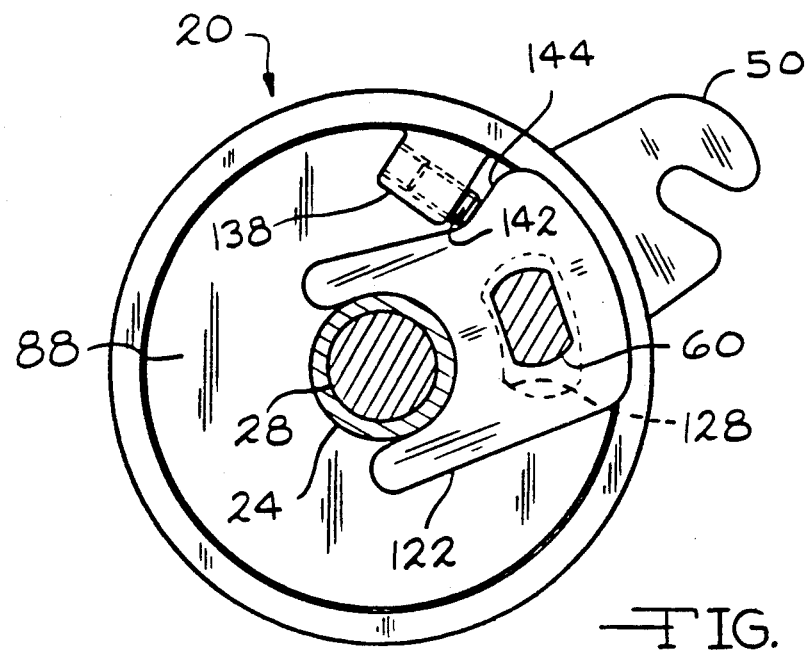
FIG. 5 is a sectional view of the clutch assembly as seen from substantially the line 5—5 of FIG. 3.

A bell crank 30 is fixed to the torsion tube 24 and has two radially spaced pivots 32 and 34, see FIG. 4. A link 36 is coupled to bell crank 30 by pivot 34 and extends rearwardly to torsion tube 26 where it is pivotally connected to a crank arm 38 extending radially from the rear torsion tube. A seat riser 40 is connected to the bell crank through pivot 32 and connected through a pivot 42 and crank arm 44 to torsion tube 26.

Counterclockwise rotation of the bell crank 30, as shown in FIG. 1, results in counterclockwise rotation of torsion tube 24 as indicated by arrow 46. Link 36 in turn causes torsion tube 26 to rotate in a clockwise direction as shown by arrow 48. This results in lowering of seat riser 40. Clockwise rotation of bell crank 30 results in raising of seat riser 40. Seat riser 40 is used to support a conventional seat assembly including a generally horizontal seat cushion and an upright seat back (not shown). As the seat riser 40 is raised and lowered so is the seat assembly. Likewise, as the sliding rail 22 is moved fore and aft, the seat assembly is also moved fore and aft to provide the four way seat adjustment. Radial crank arms 50 and 52 extending from the torsion tubes 24 and 26 respectively are coupled together with a coil assist spring 54 that is stretched when the seat riser at 40 is lowered and assists in raising the seat assembly.

A handle 56 is used to operate the clutch assembly 20 and includes a handle or grip portion 58 and a shaft portion 60. In the embodiment of the clutch assembly shown in FIG. 1, the shaft portion extends into the clutch assembly as will be described below and also passes through a radial notch 62 in the bell crank 30. When the handle is raised or lowered releasing the clutch assembly 20, the shaft portion 60 engages the bell crank to rotate the crank and thereby raise or lower the seat assembly.

The clutch assembly 20 is shown in detail with reference to FIGS. 2 through 5. At the longitudinal center of the clutch assembly is a torsion disc 64 which is fixed to the front torsion tube 24. The torsion disc has a peripheral portion 66 comprising a segment of a circle. Positioned on either side of the torsion disk 64 are clutch springs 68 and 70. Clutch spring 68 is the lowering clutch spring in that it acts to prevent the seat assembly from being lowered unless the clutch spring 68 is first released. Spring 70 is the raising clutch spring and prevents the seat assembly from being raised without first being released.

Figure 3:
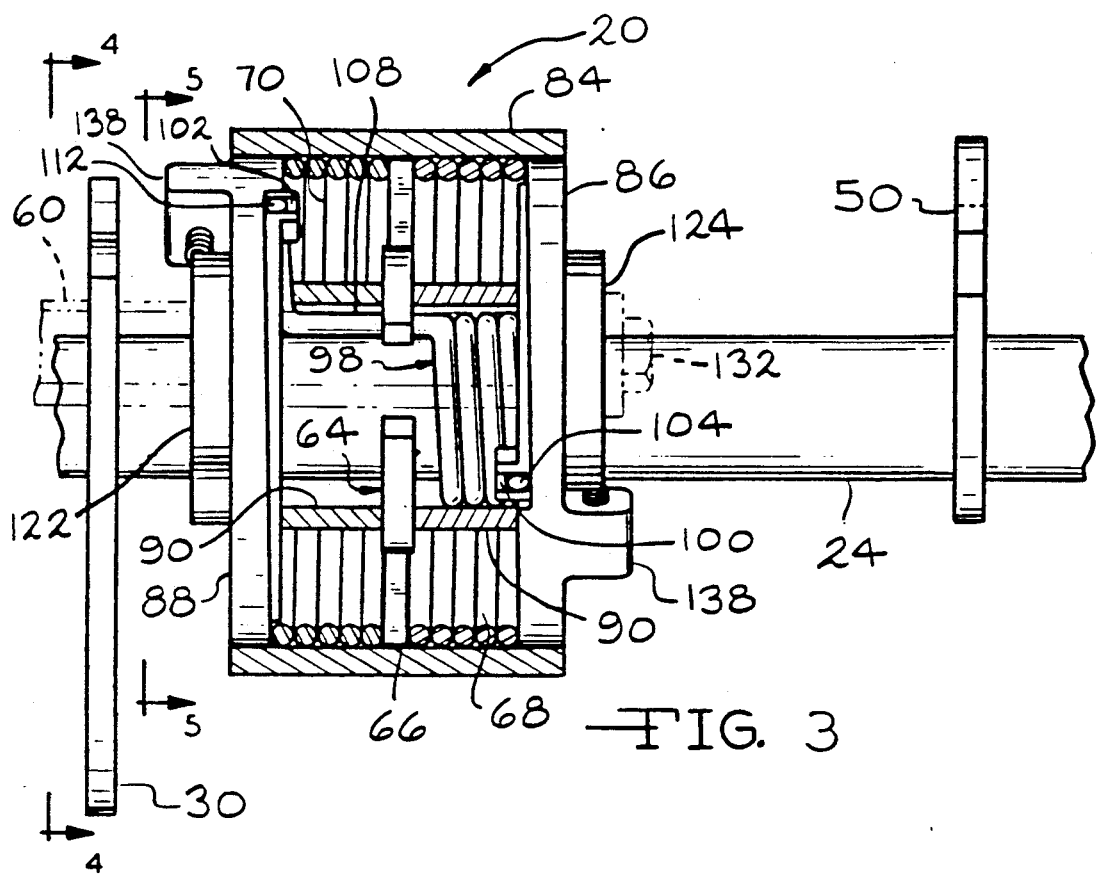
FIG. 3 is a partial sectional and partial elevational view of the clutch assembly of FIGS. 1 and 2.

The periphery 66 of the torsion disc is helical in shape and the axial direction so that when the two clutch springs are positioned on opposite sides of the torsion disc 64, the radial wall surface 72 of the torsion disc contacts the end 74 of clutch spring 68. Likewise, the other radial wall surface 76 of the torsion disc engages the end 78 of clutch spring 70. The helical offset of the torsion disc is best seen in FIG. 3. When the clutch springs are stacked against the torsion disc, the peripheral portion 66 of the disc acts as a continuation of the spring coils from one spring to the other.

Spring ends 74 and 78 are referred to as the axially inner ends of the torsion springs in that they are at the inside ends of the springs relative to the axis of the torsion tube 24. Spring ends 80 and 82 of the clutch springs 68 and 70, respectively, are correspondingly referred to as the axially outer spring ends.

A cylindrical housing 84 houses the torsion disc and the two clutch springs. Hubs 86 and 88 are positioned at each end of the housing 84 and engage the outer coils of the two clutch springs. The hubs are identical to one another and include an axial extending spacer 90, which, when the clutch is assembled, are closely fitting to the sides of the torsion disc 64 as shown in FIG. 3. The inner surface of the hubs 86 and 88 about the periphery of the hubs includes an engaging surface 92 for engagement with the outer coil of the clutch springs. A notch 94 in hub 86 engages the outer end 80 of coil spring 68. Likewise, a notch 96 in hub 88 engages the outer end 82 of spring 70.

The coil springs 68 and 70, in their relaxed states have outside diameters slightly less than the inside diameter of cylindrical housing 84 such that the coil springs freely rotate within the housing. However, when the hubs 86 and 88 are biased rotationally against the outer ends of the clutch springs, the springs, being anchored at their inner ends, are urged to expand radially outwardly against the inside surface of the cylindrical housing 84. When expanded outwardly, the friction between the clutch springs and the cylindrical housing 84 prevents relative rotation between the springs and the housing. The torsion disc, due to its engagement with the inner ends of the clutch springs, is also held stationary relative to the housing 84.

The housing 84 is fixed to the sliding rail 22 as described below. As a result of the clutch springs frictionally engaging the housing 84 and preventing rotation of the torsion disc 64, the torsion tube 24 is now held stationary preventing movement of the seat assembly in the vertical direction.

A torsional biasing spring 98 engages the two hubs 86 and 88 to rotationally bias the hubs against the coil spring outer ends to urge the springs outward into frictional engagement with the cylindrical housing. The inner surface of the hub 86 includes a generally radial slot 100 while the inner surface of the hub 88 includes an identical radial slot 102. One end 104 of biasing spring 98 extends radially outward and into slot 100 of hub 86. The coils 106 of biasing spring 98 are positioned to one side of the torsion disc 64 while the other end of the biasing spring includes an axial portion 108 extending through the opening 110 in the torsion disc and terminating in a radially outwardly extending end 112 seated in the slot 102 of hub 88.

Figure 2:
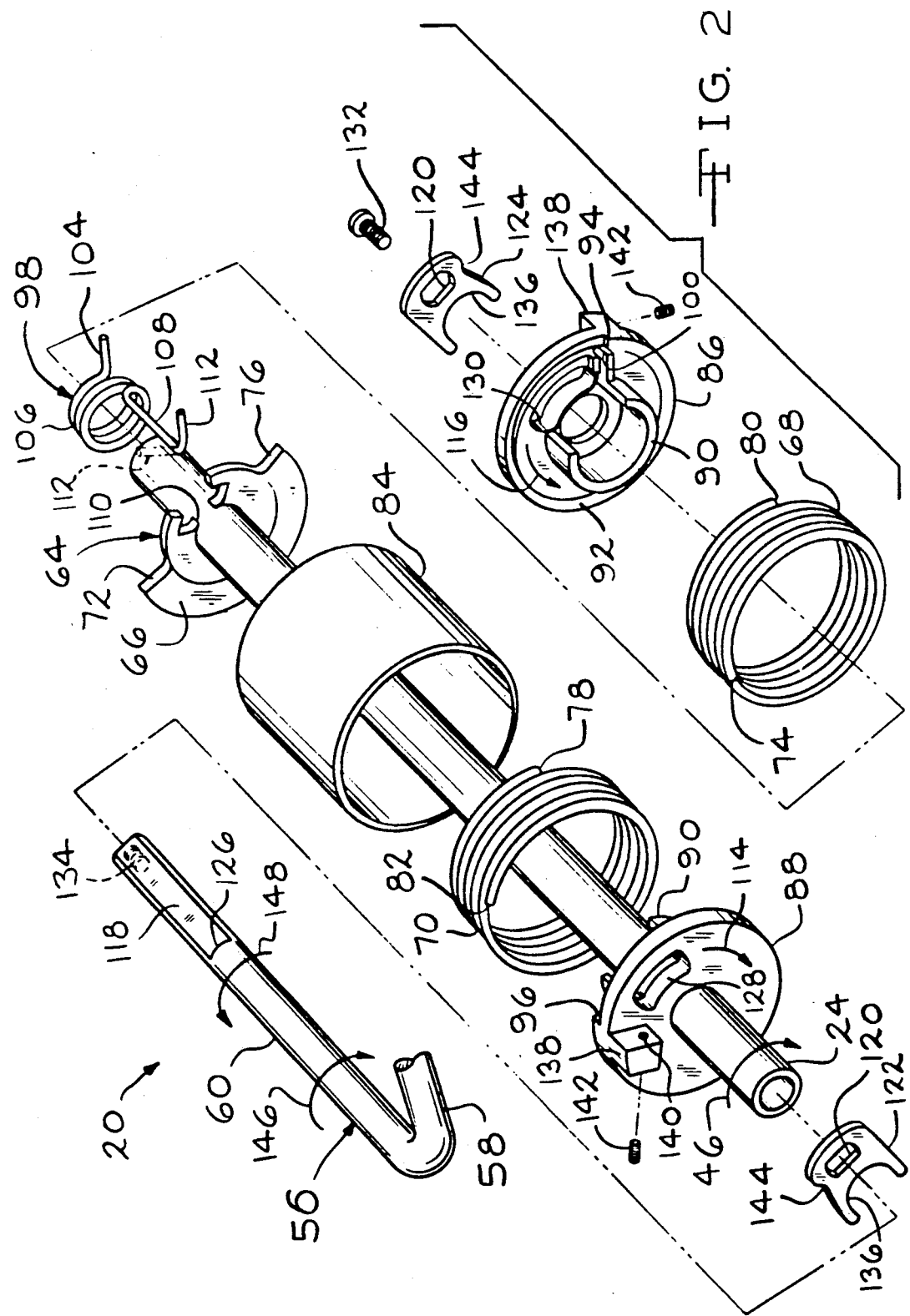
FIG. 2 is an exploded perspective view of the clutch assembly of FIG. 1.

The relaxed position of biasing spring 98 is shown in the solid lines in FIG. 2. The phantom line position of spring end 112 illustrates the relative positions of the biasing spring ends when the clutch springs 68 and 70 are at rest. After positioning the spring ends 104 and 112 into the slots in the hubs, the biasing spring urges the hub 88 clockwise in the direction of arrow 114 and urges the hub 86 counterclockwise in the direction of arrow 116. This rotation of the hubs forces the hub notch 94 against spring end 80 causing clutch spring 68 to expand while the notch 96 of hub 88 engages outer spring end 82 causing spring 70 to expand outward against the housing 84.

Actuating handle 56 is used to selectively release the clutch springs to permit rotation of the torsion tube 24. The shaft portion 60 of handle 56 includes a flattened terminal portion 118. The terminal portion 11 is closely fitted to the opening 120 in the clutch release arms 122 and 124 positioned at both ends of the clutch assembly. Release arm 122 is seated against the shoulder 126 formed in the handle at the transition between the round shaft portion and the flattened terminal portion 118. The terminal portion 118 of the handle extends through opening 128 in hub 88, through the interior of the clutch assembly, past the torsion disc 68 between the two radial wall surfaces 72 and 76 and finally through the aperture 130 in hub 86. Release arm 124 is held onto the end of handle 56 by screw 132 threaded into bore 134 in the handle end or by other similar attaching means. The two clutch release arms hold the clutch assembly together in the axial direction.

The clutch release arms 122 and 124 form semi-circular notches 136 that fit over the torsion tube 22 to position the release arms and handle relative to the torsion tube. The outer surfaces of hubs 86 and 88 include a screw block 138 each having an aperture 140 therethrough for set screws 142. Set screws 142 are positioned so as to engage the surfaces 144 of the clutch release arms. The set screws are necessary to compensate for manufacturing tolerances of the clutch assembly components. With proper adjustment, the release arms engage the set screws in the respective hubs.

To lower the seat assembly, the handle 156 is rotated generally clockwise in the direction of arrow 146. This pushes the clutch release arm 124 against set screw 142 in hub 86 rotating hub 86 in opposition to the biasing spring 98, moving the notch 94 away from outer spring end 80 thus enabling the spring 68 to relax and disengage from the inner surface of housing 84. Clutch spring 68 is now free to rotate relative to the housing enabling the torsion disc and torsion tube 24 to also rotate clockwise as shown by arrow 46. As the handle continues to rotate, the shaft portion 60 of the handle will engage the notch 62 in the bell crank 30, rotating the bell crank and lowering the seat.

When the seat has been repositioned and the handle 56 released, the biasing spring 98 will again bias the two hubs 86 and 88 in opposite directions as previously described, engaging the clutch springs with the cylindrical housing.

To raise the seat assembly, the handle 56 is rotated FIG. 2. This in turn rotates hub 88 in opposition to biasing spring 98, moving notch 96 away from outer spring end 82. This releases spring 70 from the housing, enabling the torsion disc and tube to rotate counterclockwise. Continued rotation of the handle causes the handle to engage the notch 62 in the bell crank 30 rotating the bell crank in the direction to raise the seat assembly. The clutch assembly thus provides an easy to use vertical adjustment mechanism for a seat adjuster and provides infinite adjustment.

Figure 6:
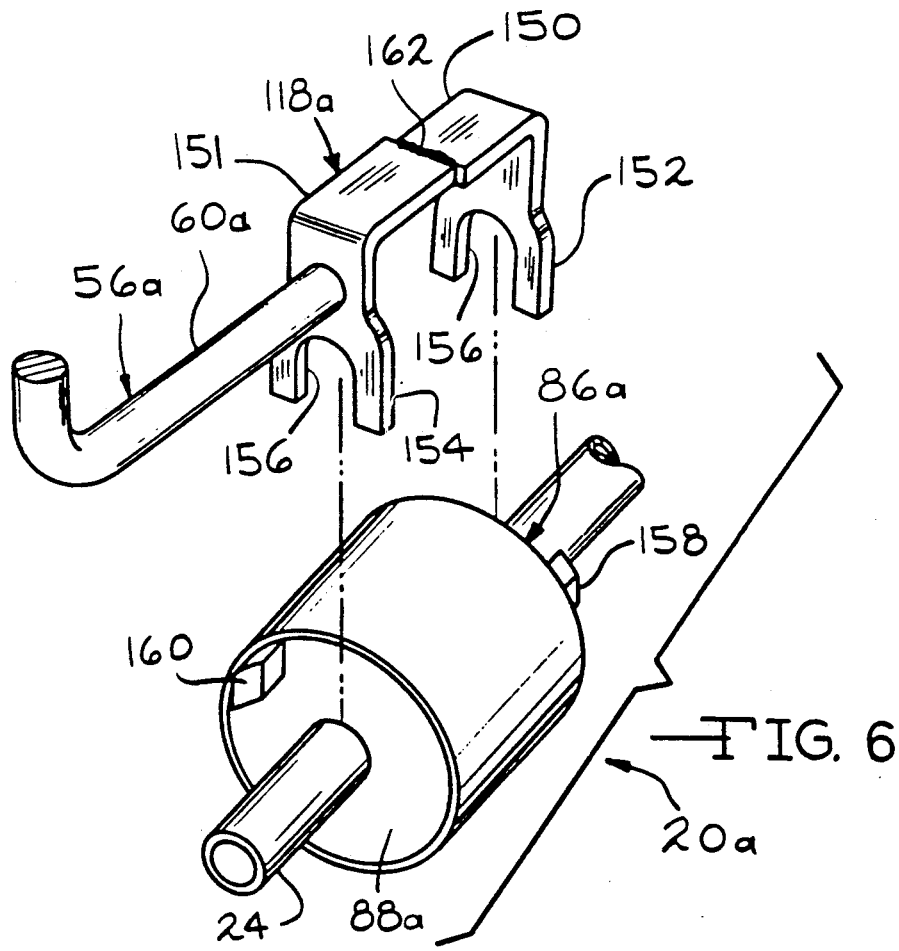
FIG. 6 is an exploded fragmentary perspective view of an alternative embodiment of the clutch assembly.

A modified embodiment of the clutch assembly 20 is shown in FIG. 6 and designated as 20a. This embodiment is permanently adjusted during assembly. The handle 56a has a two piece terminal portion 118a forming a generally U-shaped yoke. The legs 152 and 154 of the yoke terminate with notches 156 that fit over the torsion tube 24 and serve as the release arms. The two yoke halves 150 and 151 are positioned so that the legs engage the blocks 158 and 160 of hubs 86a and 88a without the use of a set screw. Once placed in position engaging the tabs, the two yoke halves are connected by weld 162 to permanently position the handle. Clutch assembly 20a has the benefit of being permanently adjusted, eliminating the need for re-adjustment during the service life of the clutch assembly.

Figure 7:
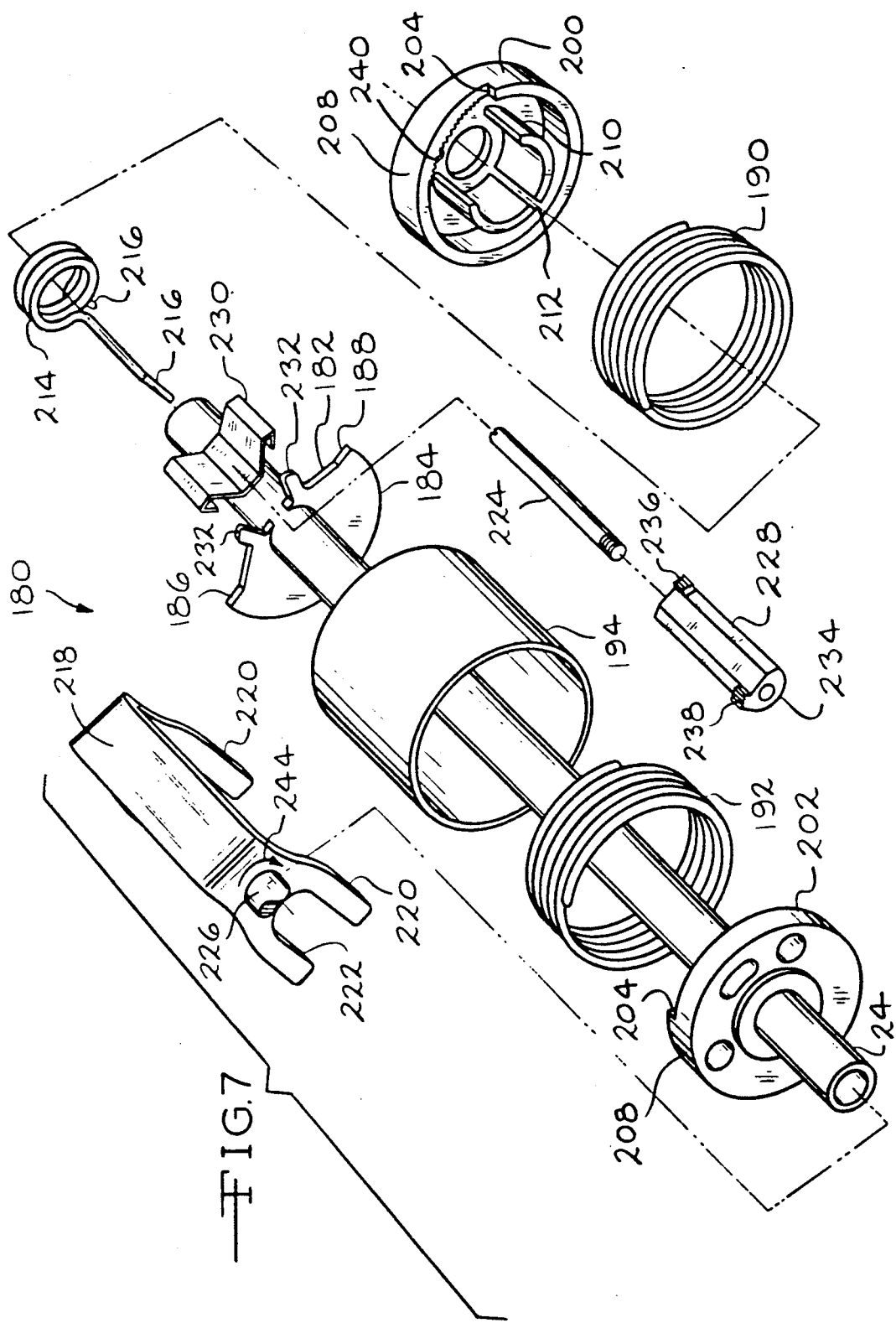
FIG. 7 is an exploded perspective view of another embodiment of the clutch assembly.
Figure 8:
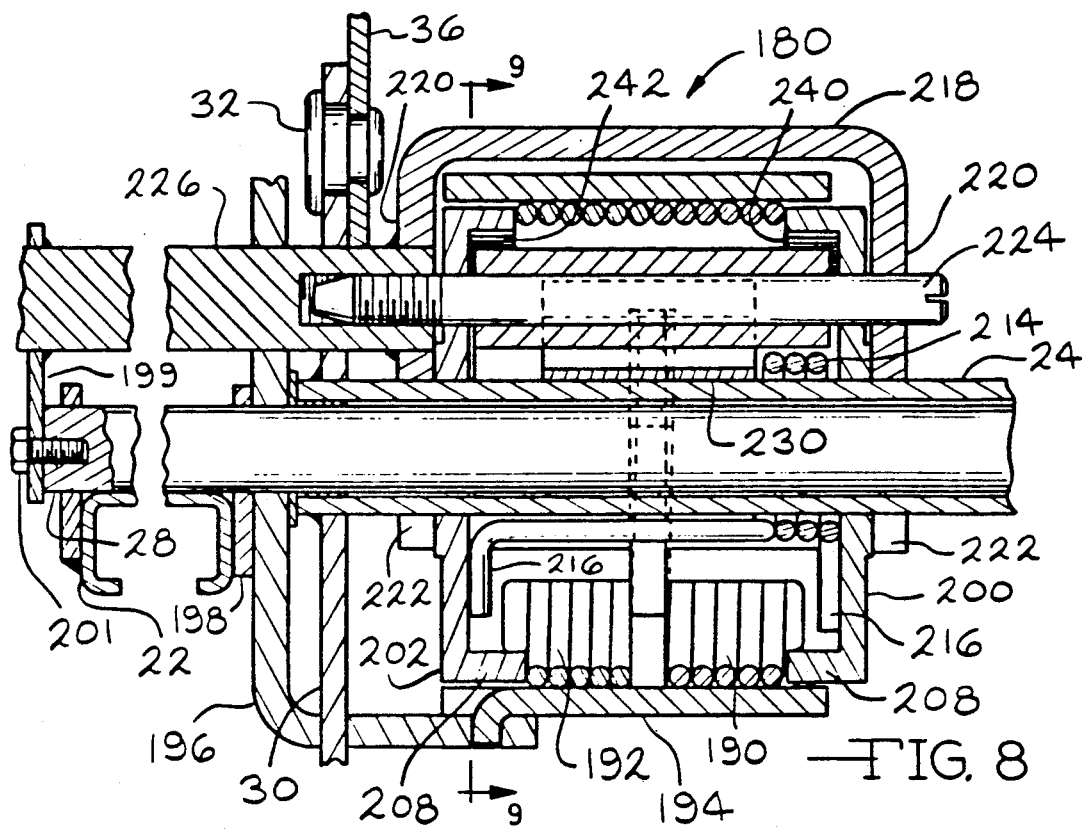
FIG. 8 is a partial sectional and partial elevational view of the clutch assembly shown in FIG. 7.
Figure 9:
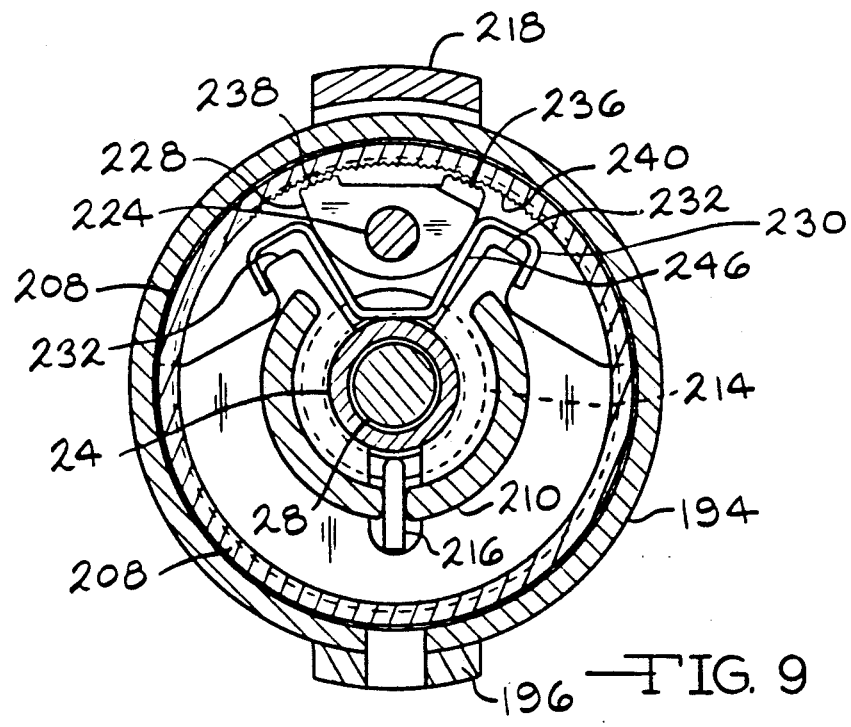
FIG. 9 is a sectional view of the clutch assembly as seen from substantially the line 9—9 of FIG. 8.

FIGS. 7, 8 and 9 illustrate another embodiment of the clutch assembly which also requires no adjustment. Clutch assembly 180 operates similarly to the clutch assembly 20 previously described. Clutch assembly 180 includes a torsion disc 182, fixed to the torsion tube 24, the peripheral portion 184 of which forms a segment of a circle and is also helical in the axial direction of the torsion tube. The peripheral portion 184 ends in two radial wall surfaces 186 and 188.

Clutch springs 190 and 192 are positioned on opposite sides of the torsion disc 182 with the axially inner ends of the springs contacting the radial wall surfaces of the torsion disc as described above with respect to clutch assembly 20. A cylindrical clutch housing 194 covers the clutch springs and again is sized slightly larger than the springs. When relaxed, the springs are freely rotatable within the clutch housing. The housing 194 is coupled to a bracket 196 secured to the solid rod 28. A coupling attaches the rod and bracket 196 to the sliding rail 22 as shown in FIG. 8. The housing 84 of clutch assembly 20 is secured to the sliding rail in a similar manner. A brace 199 is welded to the shaft portion 226 of the release handle. Brace 199 is rotatably mounted to rod 28 by screw 201. This secures the handle to the seat adjuster and provides for rotation of the shaft portion 226 about the rod 28 and torsion tube 24. The handle of clutch assembly 20 is similarly coupled to the seat adjuster.

Identical clutch release hubs 200 and 202 are positioned at both ends of the cylindrical housing 194. The inner surface of the hubs include notches 204 and 206 which engage the axially outer ends of the clutch springs 190 and 192. The notches 204 and 206 are formed in an axially extending sleeve portion 208 of the hubs positioned at the radial periphery of the hubs. A spacer 210 extends axially inwardly from the hubs toward the torsion disc 182. A slot 212 is formed in the spacers 210. A biasing spring 214 surrounds the torsion tube 24 and has radially extending ends 216 projecting through the slots 212. Biasing spring 214 rotates the two hubs in opposite directions against the clutch springs forcing the springs to expand radially outwardly against the cylindrical housing 194 holding the torsion tube 24 in place. The clutch assembly 180 as discussed so far is essentially the same as clutch assembly 20.

Clutch assembly 180 differs in the mechanism used to release the clutch to rotate torsion tube 24. The release handle terminates in a generally U-shaped yoke 218 having legs 220 each defining a U-shaped notch 222. The notches 222 are designed to fit over the torsion tube 24 as the yoke surrounds the clutch assembly. An elongated pin 224 extends through the two legs 220 and the yoke and is threaded into the shaft portion 226 of the release handle. The pin 22 extends through the center of release pawl 228. Release pawl 228 is cradled by a self-adjusting spring 230. Spring 230 is mounted on fingers 232 extending upwardly from the torsion disc 182. The bottom surface 234 of the release pawl forms a cam surface for sliding motion against the self-adjusting spring 230.

The release pawl 228 is symmetrical about its center. Raised teeth 236 and 238 are formed at each end of the pawl extending generally upwardly and being positioned on opposite sides of the pawl longitudinal center line.

The axially extending sleeves 208 at the periphery of each release hub includes arcuate tooth portions 240 and 242 on the radially innerside of the sleeves 208.

Clutch assembly 180 is released by rotation of the handle in one direction or the other. Rotation of the handle clockwise in the direction of arrow 244 as shown in FIG. 7 results in clockwise rotation or movement of the pin 224 about the center rod as viewed in FIG. 9. This movement of the pin 224 pushes the release pawl 228 against the leg 246 of the spring 230 causing the release pawl to rotate in a counterclockwise direction until the raised teeth 236 engage the teeth 240 in release hub 200. Continued rotation of the handle in the clockwise direction will rotate the hub 200 clockwise releasing the clutch spring 190 and enabling rotation of the torsion tube 24 as described previously. With continued rotation of the handle, the seat assembly will be lowered. Rotation of the handle in the opposite direction will rotate the release pawl 228 in the opposite direction, engaging the teeth 238 with the teeth 242 in hub 202, releasing clutch spring 192 and enabling the torsion tube 24 to rotate in the direction to raise the seat assembly.

Clutch assembly 180 does not require any adjustment during assembly for proper operation. The biasing spring 214 will rotate the two release hubs until the release hubs have sufficiently expanded the clutch springs 190 and 192 into engagement with housing 194. The angular extent of the teeth 240 and 242 on the release hubs is sufficient to ensure that the teeth of the release pawl will always be opposite the teeth in the hubs. As a result, the clutch assembly will begin to release once the release pawl has rotated the small amount necessary to engage the release hub.

Clutch assembly 180, like clutch assembly 20, provides an easy to operate vertical adjustment for a seat assembly while providing infinite seat adjustment.

It is to be understood that the invention is not limited to the exact construction or method illustrated and described above, but that various changes and modifications may be made without departing from the spirit and scope of the invention as defined in the following claims.

We claim:

1. A clutch assembly, comprising:
   a stationary housing having an axis;
   a pair of coil clutch springs disposed within said housing, said springs, when unstressed being freely rotatable within said housing about the axis of said housing;
   means for biasing said coil clutch springs into frictional engagement with said housing such that rotation of said clutch springs relative to said housing is prevented;
   an elongated torque transmitting member extending through said housing;
   means for selectively coupling said torque transmitting member to said clutch springs whereby, when said clutch springs are in frictional engagement with said housing, rotation of said torque transmitting member is prevented; and
   means for selectively releasing said clutch springs from frictional engagement with said housing to enable rotation of said clutch springs and said torque transmitting member.

2. The clutch assembly of claim 1 wherein said coupling means acts through one of said coil springs to resist rotation of said torque transmitting member in one direction and acts through the other of said coil springs to resist rotation of said torque transmitting member in the other direction.

3. The clutch assembly of claim 1 further comprising a crank arm fixed to said torque transmitting member and extending radially therefrom, and wherein said release means includes a handle mounted for rotation about the axis of said elongated torque transmitting member to release said clutch springs from said housing, said handle being engageable with said crank arm to rotate said crank arm and said torque transmitting member after release of said clutch springs.

4. The clutch assembly of claim 1 further comprising a crank arm fixed to said torque transmitting member and extending radially therefrom, and wherein said release means includes a handle mounted for rotation about the axis of said elongated torque transmitting member to release said clutch springs from said housing, said handle being engageable with said crank arm to rotate said crank arm and said torque transmitting member after release of one of said clutch springs, said release means releasing one spring upon handle rotation in one direction to enable rotation of said torque transmitting member in one direction and said release means releasing the other spring upon handle rotation in the other direction to enable rotation of said torque transmitting member in the other direction.

5. A clutch assembly, comprising:
   a stationary generally cylindrical housing;
   an elongated torque transmitting member extending through said housing and concentric therewith;
   a pair of coil clutch springs disposed within said housing, said springs, when unstressed, being freely rotatable within said housing about the axis of said housing, said springs being disposed axially adjacent one another and each spring having an axially inner end and an axially outer end;
   bias means associated with said spring outer ends for applying loads to said springs circumferentially to expand said springs radially outwardly to frictionally engage said housing to prevent rotation of said springs relative to said housing;
   means fixed to said torque transmitting member for engaging the inner ends of said springs to prevent rotation of said torque transmitting member relative to said housing when said clutch springs are expanded radially outwardly into frictional engagement with said housing; and
   means associated with said bias means for selectively releasing said clutch springs from said housing to enable rotation of said torque transmitting member.

6. The clutch assembly of claim 5 wherein said torque transmitting member acts against one spring through said engaging means to resist rotation in one direction and against the other spring to resist rotation in the opposite direction, said release means including a handle rotatable in one direction to release one spring enabling said torque transmitting member to rotate in one direction and said handle being rotatable in the opposite direction to release the other spring, enabling said torque transmitting member to rotate in the opposite direction.

7. The clutch assembly of claim 6 further comprising a crank arm fixed to said torque transmitting member and extending radially therefrom, said handle being engageable with said crank arm to rotate said crank arm and said torque transmitting member after release of one of said clutch springs.

8. The clutch assembly of claim 5 wherein said bias means includes a pair of end hubs, one hub disposed at one end of the housing and engaging the outer end of one spring of said pair of coil springs, the other end hub being disposed at the other end of said housing and engaging the outer end of the other spring of said pair of coil clutch springs; and
   a biasing spring engaging each of said end hubs to rationally bias said hubs in opposite directions relative to one another, each end hub engaging the outer end of the adjacent coil clutch spring to apply a circumferential load to said springs to expand said springs radially outwardly into frictional engagement with said housing.

9. The clutch assembly of claim 8, wherein said means fixed to said torque transmitting member and engaging said spring inner ends comprises a disc member forming a circular segment at its outer periphery having a radius substantially equal to the radius of said coil springs, said circular segment ending in radial wall surfaces engaging the inner ends of said coil springs, said circular segment having a helix angle substantially equal to the helix angle of said coil springs such that said circular segment forms a continuation from the inner end of one spring to the inner end of the other spring.

10. The clutch assembly of claim 8 wherein said release means includes a handle mounted for rotation about the axis of said elongated torque transmitting member, said handle coupled to said end hubs so as to move one end hub in opposition to said biasing spring when the handle is rotated in one direction and to move the other end hub in opposition to said biasing spring when the handle is moved in the other direction so as to relieve the circumferential loading of said springs to release said springs from said housing enabling said springs and said torque transmitting member to rotate along with said handle.

11. The clutch assembly of claim 10 further comprising adjustment means to eliminate lost rotational motion of said handle prior to rotation of said end hubs.

12. The clutch assembly of claim 10 wherein said handle includes a shaft portion extending generally parallel to said torque transmitting member and rotatable about the axis of said torque transmitting member, and further comprising release arms coupled to said shaft portion for engagement with said end hubs, said end hubs having means for engagement with said release arms.

13. The clutch assembly of claim 12 further comprising means for adjusting said end hub engagement means to maintain engagement with said release arms.

14. The clutch assembly of claim 13 wherein said adjustment means includes a set screw carried by each end hub and positionable in engagement with said release arms.

15. The clutch assembly of claim 12 wherein said release arms form guide means engageable with said torque transmitting member for guiding rotation of said handle about said torque transmitting member.

16. The clutch assembly of claim 12 wherein said release arms form a two piece generally U-shaped yoke axially spanning said cylindrical housing, said yoke having two generally parallel legs terminating in guides engaging said torque transmitting member on opposite ends of said housing for guiding rotation of said handle about said torque transmitting member, said yoke pieces being coupled to one another in a position in which said hub engagement means is in engagement with said yoke legs.

17. The clutch assembly of claim 8 wherein said release means includes a release pawl rotatably mounted in said housing and having a longitudinal axis parallel to the axis of said torque transmitting member, said pawl being radially spaced from said torque transmitting member, a handle rotatable about said torque transmitting member and coupled to said pawl for moving said pawl circumferentially about said torque transmitting member;

said release means further including means for rotating said pawl as said pawl moves circumferentially and including coacting means on said pawl and said end hubs for coupling said pawl and said hubs upon rotation of said pawl, said pawl coupling to one hub upon rotation of said pawl in one direction and coupling to the other hub upon rotation of said pawl in the opposite direction; and said pawl rotating said hubs after being coupled thereto upon continued rotation of said handle.

18. The clutch assembly of claim 15 wherein said handle terminates in a U-shaped yoke axially spanning said housing, said yoke having two generally parallel legs disposed at opposite ends of said housing and extending radially relative to said torque transmitting member, an elongated pin projecting through said legs and said housing and mounted to said handle, said pawl having a longitudinal passage therethrough through which said pin extends to rotationally mount said pawl, said pin moving circumferentially upon rotation of said handle to move said pawl circumferentially.

19. The clutch assembly of claim 18 further comprising cam means for guiding rotation of said pawl upon circumferential movement of said pin.

20. The clutch assembly of claim 19 wherein said guide means includes a cradle member mounted to said disc member.

21. The clutch assembly of claim 17 wherein said coupling means comprises:

gear teeth on said pawl at opposite ends of said pawl, the gear teeth at one end of said pawl moving radially outwardly upon rotation of said pawl in one direction and the gear teeth on the opposite end of said pawl moving radially outwardly upon rotation of said pawl in the opposite direction; and gear teeth on said end hubs engageable with said teeth on said pawl when said pawl is rotated.

* * * * *